H. ZWOLSMAN.
CHANGE SPEED GEAR FOR AUTOMOBILES AND THE LIKE.
APPLICATION FILED JULY 6, 1918.
1,358,275.
Patented Nov. 9, 1920.
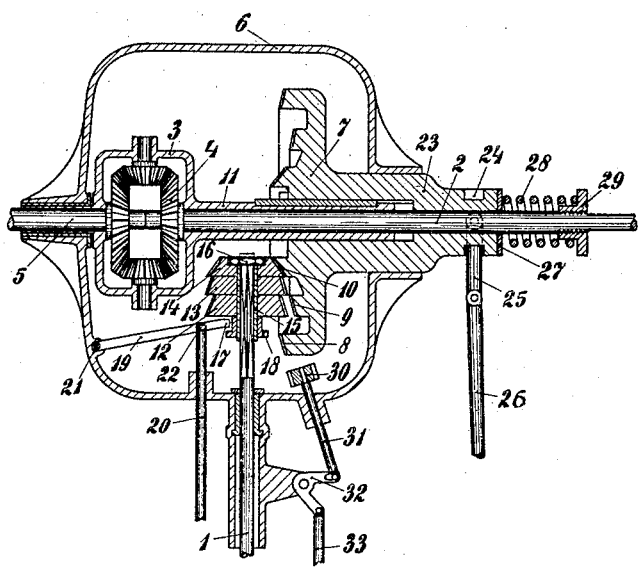
INVENTOR
Hendrik Zwolsman
By
Wm Wallace White
ATTORNEY

UNITED STATES PATENT OFFICE.

HENDRIK ZWOLSMAN, OF AMSTERDAM, NETHERLANDS.

CHANGE-SPEED GEAR FOR AUTOMOBILES AND THE LIKE.

1,358,275. Specification of Letters Patent. Patented Nov. 9, 1920.

Application filed July 6, 1918. Serial No. 243,674.

*To all whom it may concern:*

Be it known that I, HENDRIK ZWOLSMAN, a subject of the Queen of the Netherlands, residing at Amsterdam, in the Province of Noord-Holland, in the Kingdom of the Netherlands, have invented certain new and useful Improvements in Change-Speed Gears for Automobiles and the like, of which the following is a specification.

The invention relates to a change speed gear for automobiles and the like and has for its purpose the rendering superfluous of the usual gear-case with its various gear-wheels which rotate in ball bearings in an aluminium casing and which require much maintenance and are relatively costly, whereby therefore a saving in cost and also more space is obtained and the maintenance of the automobile simplified.

In accordance with the invention this purpose is attained by building an improved change speed gear into the casing of the usual differential gearing.

According to the invention this change speed gear consists of a disk movable axially on a sleeve of the casing of the differential gearing, which disk is provided with two or more sets of conical teeth for the first, second and other speeds respectively and also consists of a system of two or more conical toothed wheels for the first, second and other speeds which system is movable axially on the motor shaft. This system of bevel wheels and the disk can be engaged and disengaged by a lever operated from the driver's seat and are held in the engaged position geared with one another by spring pressure, or a cam, or any other suitable means.

In accordance with the invention the disk and the system of tooth-wheels are situated in the same casing with the ordinary differential gearing. Although this casing must be enlarged for this purpose yet the enlargement is small compared with space taken up by the ordinary change speed gear casing so that a considerable saving of space is obtained.

By the use of the disk with conical teeth and the bevel wheels working with it a direct transmission is obtained from the motor shaft on to the driven shaft and it is possible to obtain noiseless running in a simple manner by making the engaging and disengaging dependent upon the coupling and uncoupling of the friction clutch.

Further according to the invention the backward motion for the first speed is obtained in a simple manner by inserting an intermediate toothed wheel with suitable teeth between the conical teeth on the disk for the first speed and the bevel wheels for the first speed on the motor shaft.

The saving of space according to the invention obtained by the abolition of the usual change speed gear casing has the further advantage that the erection and dismantling of the friction coupling is simplified and that space is available for the arrangement of a pump or the like.

The invention is illustrated in detail on the accompanying drawing which shows the construction in section.

1 is the motor shaft and 2 the driven rear-shaft which is coupled with the rear-shaft 5 by means of the usual differential gearing 4 arranged in a casing 3. With the construction shown the casing 3 is carried by the shafts 2 and 5 but this is however not necessary.

According to the invention the change speed gear is also arranged in the gear casing 6. It consists of a disk 7 with three sets of bevel teeth 8, 9, 10 for the first, second and third speed which disk is movable in an axial direction, on a sleeve 11 on the casing 3. The change speed gear further consists of a system of three bevel wheels 12, 13, 14 for the first, second and third speed, which system of bevel wheels is slidable axially on the motor shaft 1. In the drawing the bevel wheel 14 for the third speed is shown in gear with the teeth 10 of the disk 7. The bevel wheels 12, 13 and 14 are united into one system by being fixed on to a sleeve 15 (movable on the motor shaft 1) by means of a nut 16 which lies in a hollow in the bevel wheel 14. The movement of the system of bevel wheels with the sleeve on the shaft 1 is carried out by means of a fork 17 working in a groove 18 on the extension of the bevel wheel 12 and by means of the levers 19, 20 the first of which carries the fork at its one end and at its other end 21 is hinged on to the casing 6, while the second lever 20 is attached at its end 22 with the lever 19 through a slot and pin joint and is led through the casing to the driver's seat.

The disk 7 which is movable on the sleeve 11 possesses an extended central extension 23, which is movable through the casing and which is provided outside the casing with a groove 24, in which a fork 25 works. This fork is connected to a lever 26 leading to the driver's seat and spring 28 fixed around the shaft 2 works against the end surface 27 of the extension 23 in order to bring the disk 7 into gear with the system of bevel wheels on the motor shaft, (in which position it is held by a cam or the like). The pressure of this spring can be adjusted by the aid of a nut 29 screwed on to the shaft 2.

For the backward motion with the first speed there is according to the invention another toothed wheel 30 arranged in the casing 6, which is free to rotate about a shaft 31. The shaft 31 is led through the casing 6 and can be moved backward and forward by means of a bell crank lever 32 and a lever 33 leading to the driver's seat. By inserting the toothed wheel 30 between the teeth 8 of the disk 7 and the bevel wheel 12 the direction of rotation of the disk 7 and therefore also that of the rear shaft 2 is reversed. The toothed wheel 30 must of course have teeth the shape of which allows a good engagement to be made in the bevel teeth 8 and the bevel wheel 12. As can be seen from the drawing the bevel teeth on the disk 7 are arranged in such a manner that when one of the sets of teeth is in engagement with the bevel wheel (on the motor shaft) belonging to it, the other sets of bevel teeth and the other bevel wheels run free.

The action of the above described change speed gear is as follows:

It is presupposed that the car is being driven with the first speed and that a change has to be made to the second. The friction clutch not shown on the drawing will first be disengaged after which the disk 7 is brought out of engagement with the bevel wheel 12. The system of toothed wheels is now moved along the motor shaft until the bevel wheel 13 lies opposite the teeth 9 on the disk whereby the bevel wheels 14 and 12 lie opposite the spaces between the teeth. The movement which has to be given to the disk and to the system of bevel wheels on engagement and disengagement can be limited in any known manner at the driver's seat.

After the above operation has been completed the disk 7 can again be brought into engagement that is to say the teeth 9 are brought into engagement with the bevel wheel 13. The friction clutch is then brought into operation again and the automobile runs with the second speed. It should be mentioned that according to this invention a direct transmission for each of the three speeds is obtained which greatly simplifies the construction.

What I claim is:

In a transmission gearing, a driving shaft, a plurality of gears slidably mounted thereon, a driven shaft transversely arranged with respect to the driving shaft, a plurality of concentrically arranged gears arranged on one side of the gears of the driving shaft and slidably mounted upon the driven shaft, means for actuating said gears to effect the rotation of the driven shaft at different speeds, a reversing gear adapted to be inserted between the driving gears and one of the driven gears, and means for actuating the reversing gear.

In testimony whereof I have hereunto set my hand.

HENDRIK ZWOLSMAN.

Witnesses:
D. KLIJN,
M. ALVARADO.